(12) United States Patent
Zhao et al.

(10) Patent No.: US 8,465,623 B2
(45) Date of Patent: *Jun. 18, 2013

(54) METHOD OF IMPROVING DEWATERING EFFICIENCY, INCREASING SHEET WET WEB STRENGTH, INCREASING SHEET WET STRENGTH AND ENHANCING FILLER RETENTION IN PAPERMAKING

(75) Inventors: Yulin Zhao, Shanghai (CN); Jun Li, Shanghai (CN); Qing Long Rao, Shanghai (CN); Weiguo Cheng, Naperville, IL (US)

(73) Assignee: Nalco Company, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/272,714

(22) Filed: Oct. 13, 2011

(65) Prior Publication Data
US 2012/0103548 A1    May 3, 2012

Related U.S. Application Data

(63) Continuation-in-part of application No. 12/323,976, filed on Nov. 26, 2008, now Pat. No. 8,088,250.

(30) Foreign Application Priority Data

Mar. 11, 2011  (CN) .......................... 2011 1 0068223

(51) Int. Cl.
*D21H 11/00* (2006.01)
(52) U.S. Cl.
USPC ..................................................... 162/164.6
(58) Field of Classification Search
USPC ................ 162/162, 158, 164.6, 168.1, 181.1, 162/181.4, 181.6, 181.8
See application file for complete search history.

(56) References Cited

U.S. PATENT DOCUMENTS

| | | |
|---|---|---|
| 2,037,525 A | 4/1936 | Marantz |
| 4,181,567 A | 1/1980 | Riddell et al. |
| 4,605,702 A | 8/1986 | Guerro et al. |
| 4,710,270 A | 12/1987 | Sunden et al. |
| 4,943,349 A | 7/1990 | Gomez |
| 5,126,014 A | 6/1992 | Chung |
| 5,221,435 A | 6/1993 | Smith |
| 5,676,746 A | 10/1997 | Brown |
| 6,190,663 B1 | 2/2001 | Hawkins et al. |
| 6,592,718 B1 | 7/2003 | Wong Shing et al. |
| 7,125,469 B2 | 10/2006 | Barcus et al. |
| 7,211,608 B2 | 5/2007 | Niinikoski et al. |
| 7,615,135 B2 | 11/2009 | Harrington et al. |
| 7,641,776 B2 | 1/2010 | Nagar et al. |
| 2005/0155520 A1 | 7/2005 | Van Der Horst et al. |
| 2005/0161181 A1 | 7/2005 | St. John et al. |
| 2008/0082198 A1 | 4/2008 | Gray et al. |
| 2009/0065162 A1 | 3/2009 | Cheng et al. |
| 2010/0126684 A1 | 5/2010 | Cheng et al. |

FOREIGN PATENT DOCUMENTS

GB    2016498 A1    9/1979

*Primary Examiner* — Mark Halpern
(74) *Attorney, Agent, or Firm* — Benjamin E. Carlsen; Andrew D. Sorensen (57) ABSTRACT

The invention provides a method of improving dewatering efficiency, increasing sheet wet web strength, increasing sheet wet strength and enhancing filler retention in a papermaking process The method improves the efficiency of drainage aids or wet web strength aids or wet strength aid by coating at least some of the filler particles with a material that prevents the filler materials form adhering to a those additives. The drainage additive or wet web strength additive or wet strength aid holds the cellulose fibers together tightly and is not wasted on the filler particles.

19 Claims, 5 Drawing Sheets

METHOD OF IMPROVING DEWATERING EFFICIENCY, INCREASING SHEET WET WEB STRENGTH, INCREASING SHEET WET STRENGTH AND ENHANCING FILLER RETENTION IN PAPERMAKING

CROSS-REFERENCE TO RELATED APPLICATIONS

This application is a continuation in part of application Ser. No. 12/323,976 filed on Nov. 26, 2008 now U.S. Pat. No. 8,088,250.

STATEMENT REGARDING FEDERALLY SPONSORED RESEARCH OR DEVELOPMENT

Not Applicable.

BACKGROUND OF THE INVENTION

This invention relates to a method of improving dewatering efficiency, increasing sheet wet web strength, increasing sheet wet strength and enhancing filler retention in a papermaking process. Typically in a papermaking process chemicals are added in the wet end to assist in the dewatering of the slurry, increasing retention and improving wet or dry sheet strength. The wet end of the papermaking process refers to the stage in the papermaking process where the fiber is dispersed in the water in the slurry form. The fiber-water slurry then go through drainage and dewatering process to form a wet web. The solid content after this wet formation process is about 50%. The wet web is further dried and forms a dry sheet of paper mat. Paper mat comprises water and solids and is commonly 4 to 8% water. The solid portion of the paper mat includes fibers (typically cellulose based fibers) and can also include filler.

Fillers are mineral particles that are added to paper mat during the papermaking process to enhance the resulting paper's opacity and light reflecting properties. Some examples of fillers are described in U.S. Pat. No. 7,211,608. Fillers include inorganic and organic particle or pigments used to increase the opacity or brightness, reduce the porosity, or reduce the cost of the paper or paperboard sheet. Some examples of fillers include one or more of: kaolin clay, talc, titanium dioxide, alumina trihydrate, barium sulfate, magnesium hydroxide, pigments such as calcium carbonate, and the like.

Calcium carbonate filler comes in two forms, GCC (ground calcium carbonate) and PCC (precipitated calcium carbonate). GCC is naturally occurring calcium carbonate rock and PCC is synthetically produced calcium carbonate. Because it has a greater specific surface area, PCC has greater light scattering abilities and provides better optical properties to the resulting paper. For the same reason however, PCC filled paper mat produces paper which is weaker than GCC filled paper in dry strength, wet strength and wet web strength.

Filler is generally much smaller than fiber, therefore, filler has much larger specific surface area than fiber. One of the challenges people found to increase filler content in the sheet is that high filler content decreases the efficiency of wet end chemicals, such as dewatering aids, wet web strength aids and wet strength aids. This invention is to provide novel filler pretreatment, so that it reduced the adsorption of wet end chemicals onto filler surface, therefore, increased the efficiency of wet end chemicals such as dewatering aids, wet web strength aids and wet strength aids.

Paper wet web strength is very critical for paper producers because increased paper wet web strength would increase machine runnability and reduce sheet breaks and machine down time. Paper wet web strength is a function of the number and the strength of the bonds formed between interweaved fibers of the paper mat. Filler particles with greater surface area are more likely to become engaged to those fibers and interfere with the number and strength of those bonds. Because of its greater surface area, PCC filler interferes with those bonds more than GCC.

Paper dewatering efficiency is also very critical for paper producers because decreased dewatering efficiency in wet wed would increase steam demand for drying operation, reduce machine speed and production efficiency. Dewatering aids are widely used to improve dewatering efficiency for reducing energy consumption, increasing machine speed and production efficiency.

BRIEF SUMMARY OF THE INVENTION

At least one embodiment of the invention is directed towards a method of papermaking having improved sheet wet strength or wet web strength or increased drainage or filler retention through combining filler pretreatment and drainage aid or wet web strength aid or wet strength aid. The method comprises the steps of: providing a blend of filler particles, at least one drainage additive or one wet strength aid or one wet web strength aid, and cellulose fiber stock; treating the filler particles with a composition of matter, combining the filler particles with the cellulose fiber stock; and forming a paper mat by removing some of the water from the combination. At least 10% of the filler particles are the precipitated form of calcium carbonate (PCC) and at least 10% of the filler particles are the ground form of calcium carbonate (GCC). The cellulose fiber stock comprises a plurality of cellulose fibers and water. The composition of matter inhibits drainage aid or wet strength additive or wet web strength additive from adhering to the filler particles. In at least one embodiment, the cellulose fiber stock and the filler particles are combined to form a furnish and subsequently the filler particles are treated with the composition of matter.

At least one embodiment of the invention is directed towards a method in which the blend of filler particles further comprises one item selected from the list consisting of: calcium carbonate, organic pigment, inorganic pigment, clay, talc, titanium dioxide, alumina trihydrate, barium sulfate, magnesium hydroxide, and any combination thereof.

At least one embodiment of the invention is directed towards a method in which the composition of matter is an AcAm/DADMAC copolymer. At least one embodiment of the invention is directed towards a method in which the wet strength aid or wet web strength additive or drainage aid is glyoxylated Acrylamide/DADMAC copolymer. At least one embodiment of the invention is directed towards a method in which the wet web strength additive or wet strength aid or drainage aid and the composition of matter carry the same charge.

At least one embodiment of the invention is directed towards a method in which the calcium carbonate is in one form selected from the list consisting of dry calcium carbonate, dispersed slurry calcium carbonate, chalk, and any combination thereof. At least a portion of the calcium carbonate can be in a dispersed slurry calcium carbonate form, the dispersed slurry calcium carbonate further comprising at least one item selected from: polyacrylic acid polymer dispersants, sodium polyphosphate dispersants, Kaolin clay slurry, and any combination thereof. The blend of filler particles can be 50% GCC and 50% PCC. The composition of matter can be a coagulant and can be selected from the list consisting of: inorganic coagulants, organic coagulants, condensation polymerization coagulants, and any combination thereof. The coagulant can have a molecular weight range of between 200 and 1,000,000.

At least one embodiment of the invention is directed towards a method in which the composition of matter is a coagulant selected from the list consisting of alum, sodium aluminate, polyaluminum chlorides, aluminum chlorohydroxide, aluminum hydroxide chloride, polyaluminum hydroxychloride, sulfated polyaluminum chlorides, polyaluminum silica sulfate, ferric sulfate, ferric chloride, epichlorohydrin-dimethylamine (EPI-DMA), EPI-DMA ammonia crosslinked polymers, polymers of ethylene dichloride and ammonia, condensation polymers of multifunctional diethylenetriamine, condensation polymers of multifunctional tetraethylenepentamine, condensation polymers of multifunctional hexamethylenediamine condensation polymers of multifunctional ethylenedichloride, melamine polymers, formaldehyde resin polymers, cationically charged vinyl addition polymers, and any combination thereof.

At least one embodiment of the invention is directed towards a method in which the ratio of wet strength aid or drainage aid or wet web strength aid relative to the solid portion of the paper mat can be 0.3 to 5 kg of additive per ton of paper mat. At least some of the GCC particles can be treated with the composition of matter. At least one embodiment of the invention is directed towards a method in which none of the PCC particles are treated with the composition of matter. The filler particles can have a mass, which is up to 50% of the combined mass of the solid portion of the paper mat. The wet strength aid or wet web strength additive or drainage additive and the composition of matter can carry the same charge.

At least one embodiment of the invention is directed to a composition of matter for use in a papermaking process. The composition of matter comprises: cellulose, filler particles, a wet strength aid or wet web strength additive or drainage additive, and a coating surrounding at least some of the filler particles. The coating is constructed and arranged to prevent the wet strength aid or wet web strength additive or drainage aid from adhering to the filler particles. In at least one embodiment, at least some of the filler particles are calcium carbonate. In at least one embodiment, the filler particles are GCC, PCC, or a combination of the two. In at least one embodiment, the filler particles comprise at least 10% PCC and 10% GCC.

BRIEF DESCRIPTION OF THE DRAWINGS

A detailed description of the invention is hereafter described with specific reference being made to the drawings in which.

DETAILED DESCRIPTION OF THE INVENTION

In at least one embodiment of the invention is a method of making paper which comprises filler. In at least one embodiment of the invention the method of papermaking comprises the steps of: creating a filler blend of PCC and GCC in which PCC comprises at least 10% by mass of the filler and GCC comprises at least 10% of the filler mass, pre-treating at least some of the filler particles with a coating that decreases the adhesion between a wet web strength additive or drainage aid or wet strength aid and the filler particles, and adding both the filler blend and the wet web strength additive or drainage aid or wet strength aid to the paper mat.

It has been known for some time that adding wet web strength additives or drainage aid or wet strength aid to paper mat increases the wet web strength of the resulting paper or enhances drainage or improves machine speed and runnability or enhance sheet wet strength. Some examples of wet strength aids, wet web strength additives and drainage aids are described in U.S. Pat. Nos. 7,125,469, 7,615,135 and 7,641,776.

Unfortunately it is not practical to add large amounts of wet strength aids or wet web strength additives or drainage aids to compensate for the weakness due to large amounts of filler in paper mat. One reason is because those additives are expensive and using large amounts of additives would result in production costs that are commercially non-viable. In addition, adding too much additive negatively affects the process of papermaking and inhibits the operability of various forms of papermaking equipment. Furthermore cellulose fibers can only adsorb a limited amount of wet strength aid or wet web strength additive or drainage aid. This imposes a limit on how much additive can be used. One reason why this is so is because wet strength aid or wet web strength additive or drainage aid tend to neutralize the anionic fiber/filler charges and when these charges are neutralized further adsorption of those additives is inhibited.

Adding filler to the paper mat also reduces the effectiveness of the wet strength aid or wet web strength additive or drainage aid. Those additives have a tendency to coat the filler particles. The more filler particles present, the more additive coats the filler particles, and therefore there is less wet strength aid or wet web strength additive or drainage available to bind the cellulose fibers together. Because there is a maximum amount of wet strength aid or wet web strength additive or drainage that can be added, more filler has always meant less effective strength additive. This effect is more acute with PCC than GCC because PCC's higher surface area becomes more coated with the additives than GCC.

In at least one embodiment of the invention at least some of the filler particles are pre-treated with a composition of matter to at least partially prevent the adherence of wet strength aid or wet web strength additive or drainage aid to the filler particles. The pre-treatment contemplates entirely coating some or all of one or more filler particles with the composition of matter. In the alternative, the pre-treatment contemplates applying the composition of matter to only a portion of one or more of the filler particles, or completely coating some filler particles and applying the composition of matter to only a portion of some other particles. In at least one embodiment the pre-treatment is performed with at least some of the compositions of matter described in U.S. Pat. No. 5,221,435 and in particular the cationic charge-biasing species described therein. In at least one embodiment the pre-treatment is performed with a diallyl-N,N-disubstituted ammonium halide-acrylamide copolymer described in U.S. Pat. No. 6,592,718.

While pre-treating filler particles is known in the art, prior art methods of pre-treating filler particles are not directed towards affecting the adhesion of the wet strength aid or wet web strength additive or drainage aid to the filler particles. In fact, many prior art pre-treatments increase the adhesion of the strength additive to the filler particles. For example, U.S. Pat. No. 7,211,608 describes a method of pre-treating filler particles with hydrophobic polymers. This pre-treatment however does nothing to the adhesion between the strength additive and the filler particles and merely repels water to counterbalance an excess of water absorbed by the strength additive. In contrast, the invention decreases the interactions between the wet strength aid or wet web strength additive or drainage aid and the filler particles and results in an unexpectedly huge increase in paper strength, sheet dewatering and machine runnability.

Figure 1:
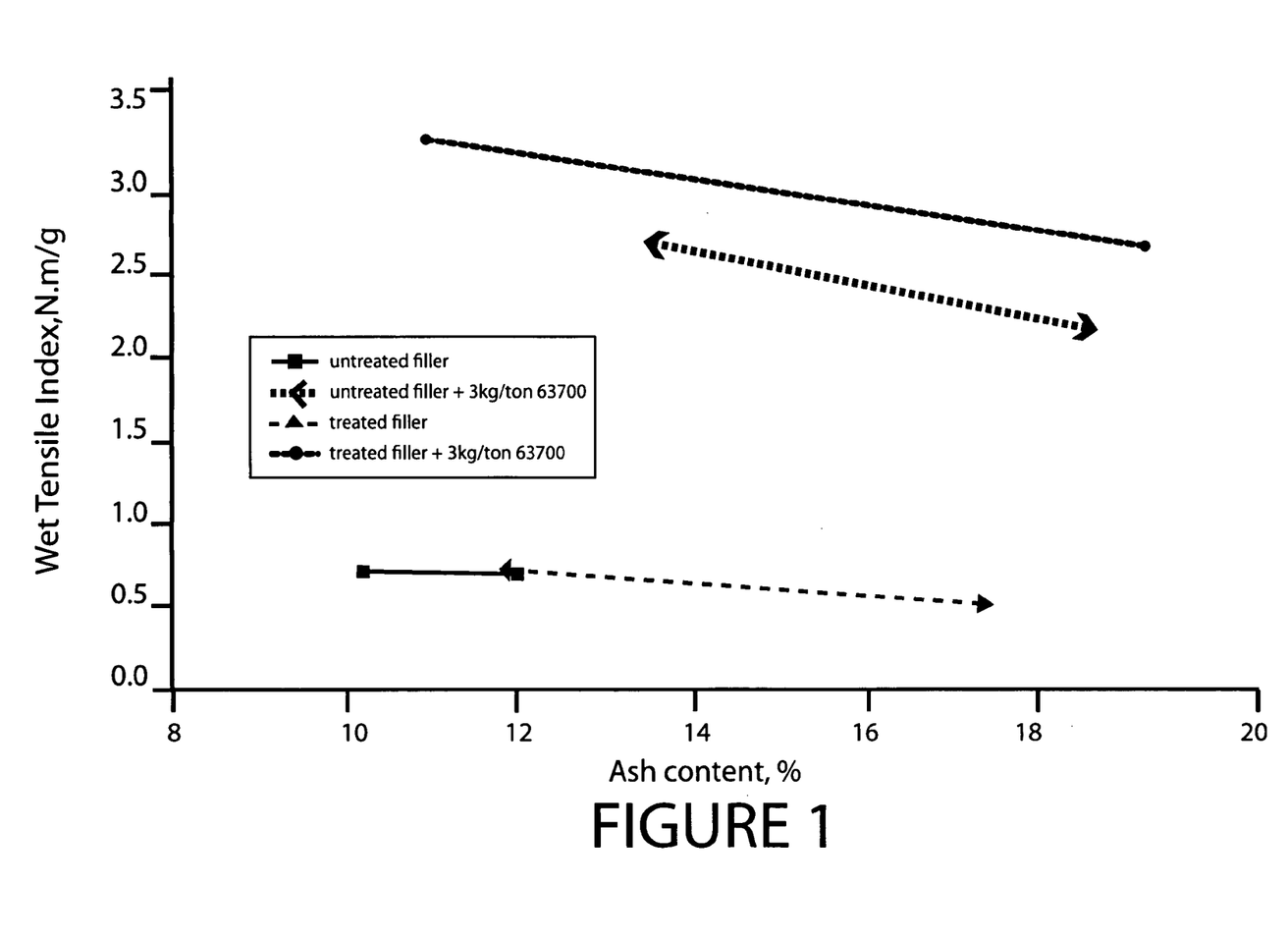
FIG. 1 is a graph showing the improved wet strength of paper made according to the invention.

FIG. 1 shows wet tensile strength of a given paper versus the percentage of filler relative to the total solid portion of the paper mat used to produce the given paper. The results clearly illustrates that sheet had very weak wet strength without addition of wet strength aid 63700 (temporary wet strength aid). Velox could significantly increase sheet wet strength. Filler pretreatment alone did not increase sheet wet strength. However, filler pretreatment further enhance Velox performance which resulted in higher sheet wet strength.

Figure 2:
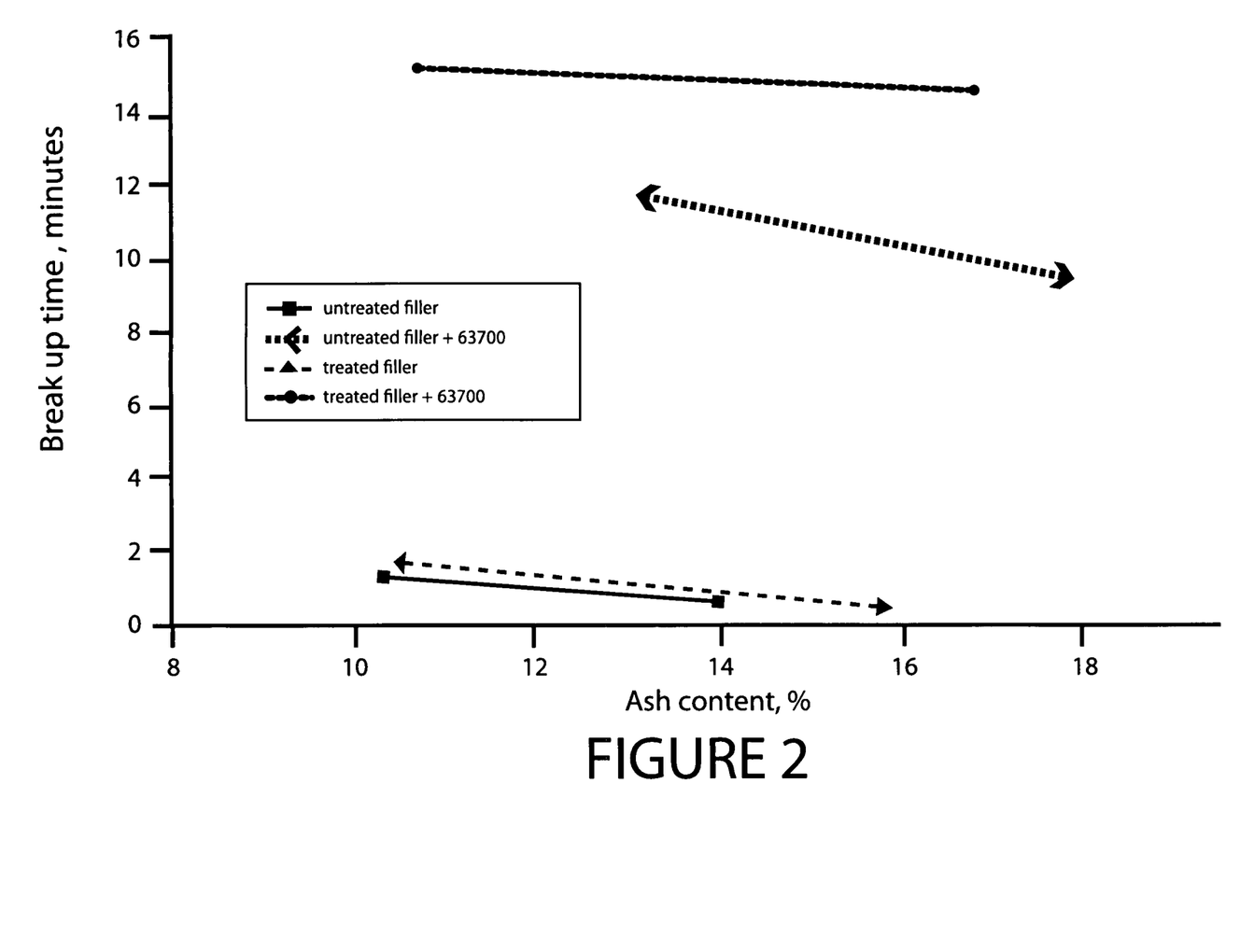
FIG. 2 is a graph showing the improved wet web strength of paper made according to the invention.

FIG. 2 plots wet web tensile strength of a given paper versus the percentage of filler relative to the total solid portion of the paper mat used to produce the given paper. As shown in FIG. 2, the relationship between increasing filler content and decreasing paper wet web strength is a linear relationship. Without the addition of Nalco dewatering aid (wet web strength aid) 63700, paper sheet had very poor wet web strength. Sheet wet web strength could be significantly improved by the using of Nalco dewatering aid 63700. Filler pretreatment alone had negligible effect on paper wet web strength. However, filler pretreatment could further boost the performance of Nalco dewatering aid 63700, and additional 20% wet strength improvement was achieved by the filler pretreatment at the lower ash content. As for the higher ash content, the performance of 63700 was boosted even higher than 20%. This is because the reduced effectiveness of the strength additive trapped against the filler particles was released by the filler pretreatment.

At least some of the fillers encompassed by this invention are well known and commercially available. They include any inorganic or organic particle or pigment used to increase the opacity or brightness, reduce the porosity, or reduce the cost of the paper or paperboard sheet. The most common fillers are calcium carbonate and clay. However, talc, titanium dioxide, alumina trihydrate, barium sulfate, and magnesium hydroxide are also suitable fillers. Calcium carbonate includes ground calcium carbonate (GCC) in a dry or dispersed slurry form, chalk, precipitated calcium carbonate (PCC) of any morphology, and precipitated calcium carbonate in a dispersed slurry form. The dispersed slurry forms of GCC or PCC are typically produced using polyacrylic acid polymer dispersants or sodium polyphosphate dispersants. Each of these dispersants imparts a significant anionic charge to the calcium carbonate particles. Kaolin clay slurries also are dispersed using polyacrylic acid polymers or sodium polyphosphate.

In at least one embodiment, the treating composition of matter is any one of or combination of the compositions of matter described in U.S. Pat. No. 6,592,718. In particular, any of the AcAm/DADMAC copolymer compositions described in detail therein are suitable as the treating composition of matter. An example of an AcAm/DADMAC copolymer composition is product# Nalco-4690 from Nalco Company of Naperville, Ill. (hereinafter referred to as 4690).

The treating composition of matter can be a coagulant. The coagulants encompassed in this invention are well known and commercially available. They may be inorganic or organic. Representative inorganic coagulants include alum, sodium aluminate, polyaluminum chlorides or PACs (which are also known as aluminum chlorohydroxide, aluminum hydroxide chloride, and polyaluminum hydroxychloride), sulfated polyaluminum chlorides, polyaluminum silica sulfate, ferric sulfate, ferric chloride, and the like and blends thereof.

Some organic coagulants suitable as a treating composition of matter are formed by condensation polymerization. Examples of polymers of this type include epichlorohydrin-dimethylamine (EPI-DMA), and EPI-DMA ammonia crosslinked polymers.

Additional coagulants suitable as a treating composition of matter include polymers of ethylene dichloride and ammonia, or ethylene dichloride and dimethylamine, with or without the addition of ammonia, condensation polymers of multifunctional amines such as diethylenetriamine, tetraethylenepentamine, hexamethylenediamine and the like with ethylenedichloride and polymers made by condensation reactions such as melamine formaldehyde resins.

Additional coagulants suitable as a treating composition of matter include cationically charged vinyl addition polymers such as polymers, copolymers, and terpolymers of (meth) acrylamide, diallyl-N,N-disubstituted ammonium halide, dimethylaminoethyl methacrylate and its quaternary ammonium salts, dimethylaminoethyl acrylate and its quaternary ammonium salts, methacrylamidopropyltrimethylammonium chloride, diallylmethyl(beta-propionamido)ammonium chloride, (beta-methacryloyloxyethyl)trimethyl ammonium methylsulfate, quaternized polyvinyllactam, vinylamine, and acrylamide or methacrylamide that has been reacted to produce the Mannich or quaternary Mannich derivatives. Preferable quaternary ammonium salts may be produced using methyl chloride, dimethyl sulfate, or benzyl chloride. The terpolymers may include anionic monomers such as acrylic acid or 2-acrylamido 2-methylpropane sulfonic acid as long as the overall charge on the polymer is cationic. The molecular weights of these polymers, both vinyl addition and condensation, range from as low as several hundred to as high as several million. Preferably, the molecular weight range should be from about 20,000 to about 1,000, 000. In at least one embodiment, the pre-treatment is preformed by a combination of one, some, or all of any of the compositions of matter described as suitable compositions of matter for pre-treating the filler particles.

In at least one embodiment, the wet strength aid or wet web strength additive or drainage aids carries the same charge as the composition of matter suitable for treating the filler particles. When the two carry the same charge, the filler additive is less likely to adsorb wet strength aid, wet web strength additive or drainage aid on its surface. Wet strength aids, wet web strength additives or drainage aids encompassed by the invention include any one of the compositions of matter described in U.S. Pat. No. 4,605,702 and US Patent Application 2005/0161181 A1 and in particular the various glyoxylated Acrylamide/DADMAC copolymer compositions described therein. An example of a glyoxylated Acrylamide/DADMAC copolymer composition is product# Nalco 63700 (made by Nalco Company, Naperville, Ill.). Another example of is amine-containing polymers including allylamine/acrylamide copolymers and polyvinylamines; one more example is Polyamide-Polyamine-Epichlorohydrin (PAE)

In at least one embodiment, the fillers used are PCC, GCC, and/or kaolin clay. In at least one embodiment, the fillers used are PCC, GCC, and/or kaolin clay with polyacrylic acid polymer dispersants or their blends. The ratio of wet strength additive or wet web strength aid or drainage additive relative to solid paper mat can be 3 kg of additive per ton of paper mat.

The foregoing may be better understood by reference to the following example, which is presented for purposes of illustration and is not intended to limit the scope of the invention.

Example 1

1(i) Filler Pre-Treatment:

A blend of filler particles was obtained from a paper mill. The blend filler was a mixture of 50% PCC and 50% 100% GCC. The filler blend was diluted to 20% solid content with tap water. 200 mL of the diluted filler blend was placed in a 500 mL glass beaker. Stirring was conducted for at least 30 seconds prior to the addition of coagulant. The stirrer was a EUROSTAR Digital overhead mixer with a R1342, 50 mm, four-blade propeller (both from IKA Works, Inc., Wilmington, N.C.). A coagulant solution was slowly added after the initial 30 seconds of mixing under stirring with 800 rpm. The coagulant solution used was 4690. The dose of coagulant was 1 kg/ton based on dry filler weight. Stirring continued at 800 rpm until all the coagulant was added. Then the stirring speed increased to 1500 rpm for one minute.

1(ii) Use of Filler:

Furnish was prepared by disintegrating commercial bleached hardwood dry lap. The mixture of 50% PCC and 50% GCC was added to pulp furnish to achieve different filler content in the sheet. 200 ppm Nalco 61067 was used as retention aid. For the pretreatment evaluation, filler mixture was pretreated using Nalco coagulant 4690 before filler was added into the furnish. During the handsheet preparation, 3 kg/ton Nalco 63700 was added to improve the sheet wet web strength. The result was shown in FIG. 2. We tried to evaluate the effect of filler pretreatment on the press dewatering performance of 63700 by measuring sheet wet web strength. Handsheets were pressed to a certain solid content (50%) by controlling the same pressure level at 60 degree C., and the time required to completely break up wet sheet in water under the shear force of 1000 RPM was recorded to compare sheet wet web strength, which was expected to indirectly reflect press dewatering. The results showed in FIG. 2 indicated that sheet wet web strength could be significantly improved by the addition of 63700. Filler pretreatment could further boost sheet wet web strength by additional 20% at the lower ash content. As for the higher ash content, the performance of 63700 was even higher than 20%.

Example 2

A machine trial was run in which a papermaking machine made GAB300 with machine speed of 900 m/min. A composition was provided whose cellulose fibers were 14% MXW; 3% coated broke; 17% SOW; 12% Uncoated Broke, 44% DIP and 10% ONP. The furnish also contained GCC. During the trial, all the wet end additives including 15/ton Nalco press dewatering aid 63700, retention aids, sizing agents, and cationic starches were kept constant.

Figure 3:
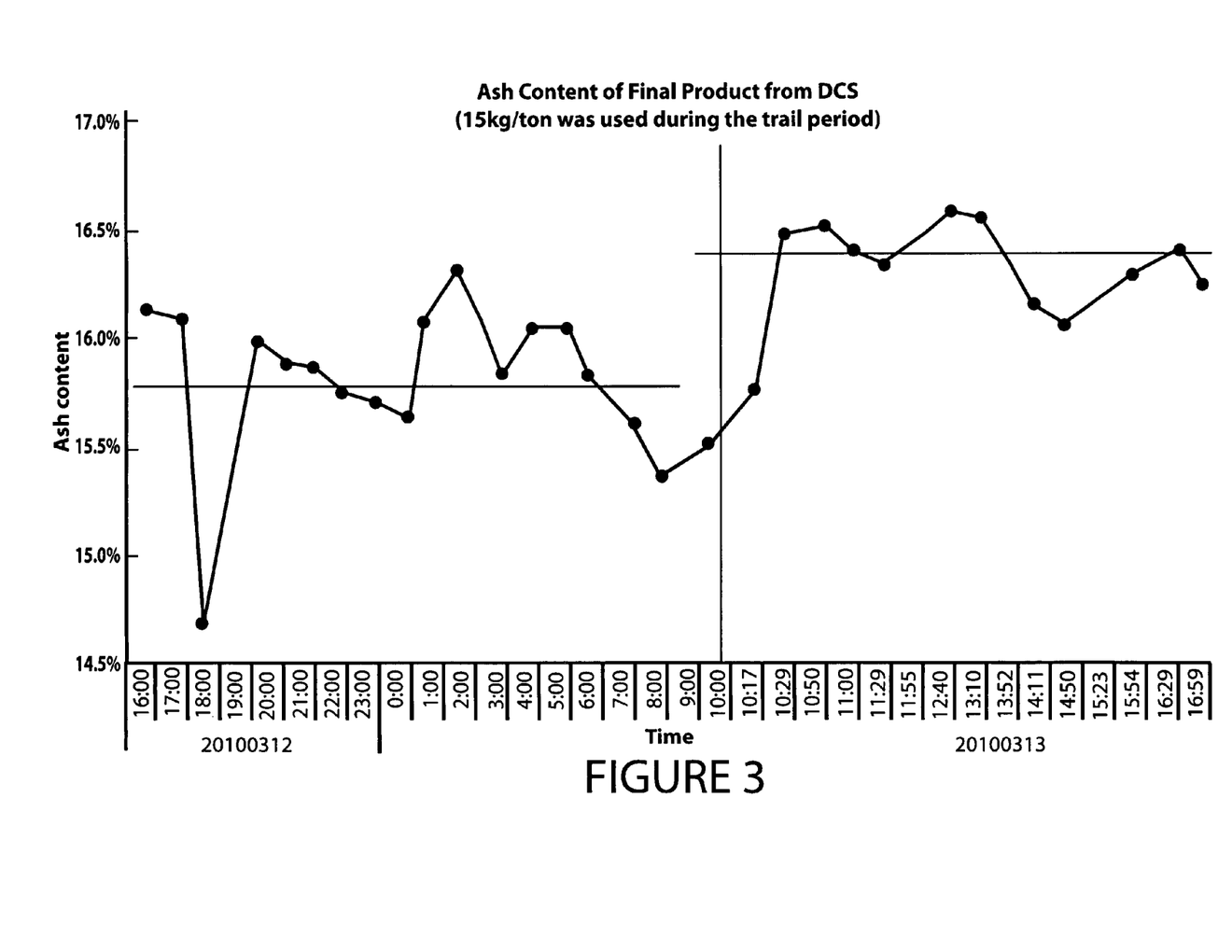
FIG. 3 is a second graph showing the improved ash content in the sheet according to the invention.
Figure 4:
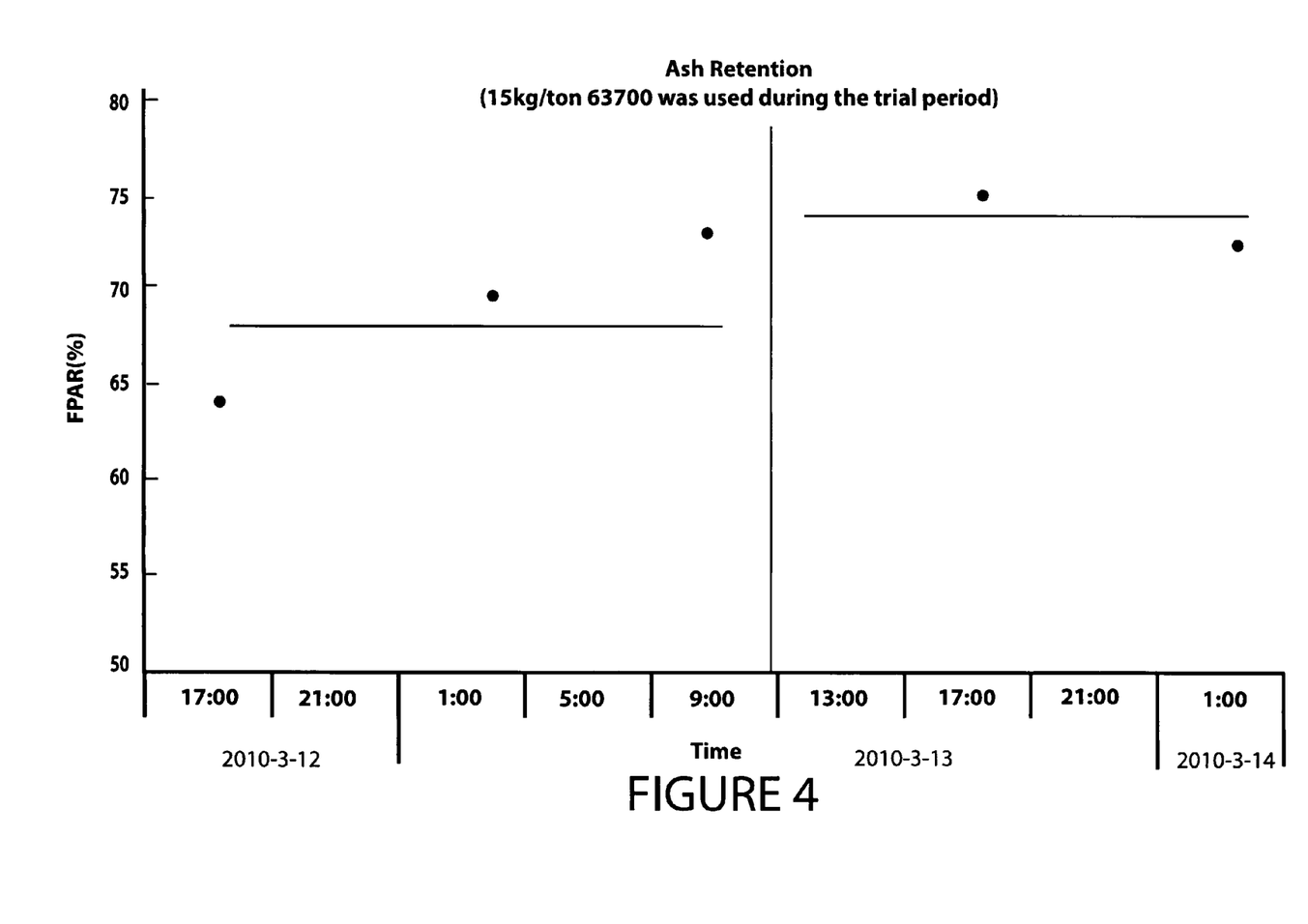
FIG. 4 is a third graph showing the improved filler retention according to the invention.

1) Filler Retention Enhancement:

4690 was gradually increased from 0.5 kg/ton to 2 kg/ton based on filler. It was found that online ash content was increased gradually with the addition of 4690 to the filler pipe as shown in FIG. 3. Obviously, 0.7 ash point increase from 15.6% to 16.3% was obtained through filler pre-treatment. Historically, for the same grade production, recorded ash content of DCS was about 12% without using Nalco 63700. It should be pointed out that the ash content improvement was only contributed by filler ply. Therefore, ash content increase in filler ply was supposed to be about 1.4% because filler ply accounted for half basis weight of the final product. FIG. 4 showed the FPAR of filler ply. It clearly illustrated that FPAR was increased from 70% to 75%, which could explain why final ash content was significantly enhanced.

Figure 5:
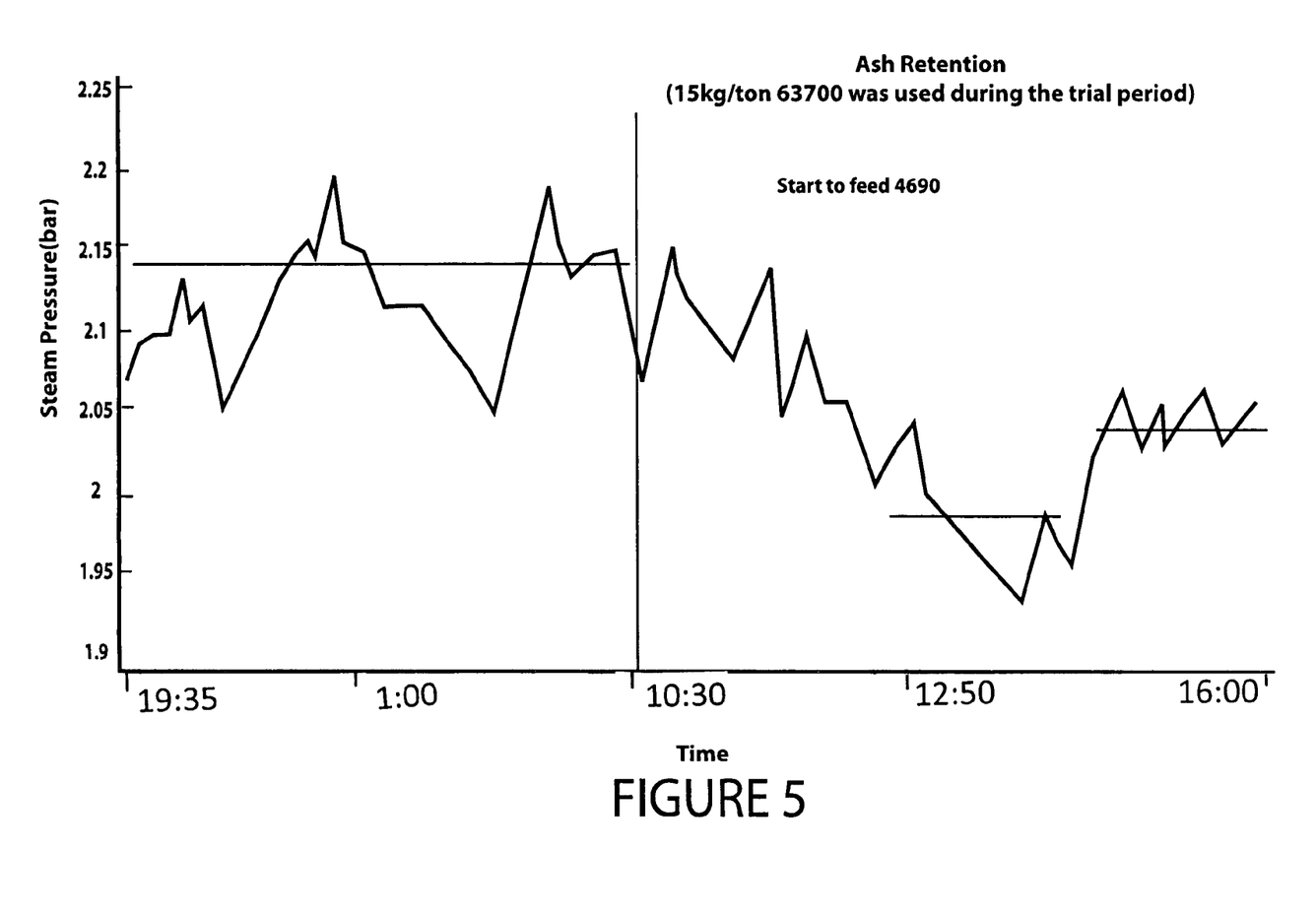
FIG. 5 is a graph showing the steam pressure reduction (drainage enhancement) according to the invention.

2) Steam Pressure Reduction:

It was also found that steam pressure of the pre-dryer was reduced through filler treatment as shown in FIG. 5. Steam pressure was gradually decreased from 2.15 to 2 bar from 10:30 am to 2:00 pm. Even though press pressure of the first press section and press pressure of the second press section were reduced from 550 to 470 and 600 to 580 respectively, the steam pressure only went back to 2.05.

During the trial, the ash content increased from around 15.6% to 16.3% about 1 hour after the filler was pretreated, then was kept at the same level for several hours. On the other hand, the steam pressure kept decreasing for several hours until the press load was reduced. This seems to indicate that the steam reduction was not only from ash content increase. Moreover, the steam demand reduction of this trial was only from filler ply since 4690 was only applied for this ply, thus the total steam reduction caused by ash content increase alone should be less. Therefore, the results illustrated that filler pre-treatment could enhance 63700 performance as press dewatering agent or wet web strength aid.

A person of ordinary skill in the art will recognize that all of the previously described methods are also applicable to paper mat comprising other non-cellulose based fibrous materials, paper mats comprising a mixture of cellulose based and non-cellulose based fibrous materials, and/or synthetic fibrous based materials.

Changes can be made in the composition, operation, and arrangement of the method of the invention described herein without departing from the concept and scope of the invention as defined in the claims. While this invention may be embodied in many different forms, there are described in detail herein specific preferred embodiments of the invention. The present disclosure is an exemplification of the principles of the invention and is not intended to limit the invention to the particular embodiments illustrated. Furthermore, the invention encompasses any possible combination of some or all of the various embodiments described herein. All patents, patent applications, and other cited materials mentioned anywhere in this application or in any cited patent, cited patent application, or other cited material are hereby incorporated by reference in their entirety. Furthermore this invention contemplates embodiments which exclude one, some, or all of the compositions, methods, components, elements, or other portions of any cited material.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of papermaking comprising filler, the method comprising the steps of: providing a blend of filler particles, at least one drainage additive or wet web strength additive or wet strength aid, and cellulose fiber stock, treating the filler particles with a composition of matter in the absence of cellulose fiber stock,
combining the filler particles with the cellulose fiber stock,
treating the combination with at least one wet strength aid or wet web strength additive or drainage additive, and
forming a paper mat from the combination,
wherein at least 10% of the filler particles are precipitated calcium carbonate and at least 10% of the filler particles are ground calcium carbonate, the cellulose fiber stock comprises a plurality of cellulose fibers and water, and the composition of matter enhances the performance of the wet strength aid or wet web strength additive or drainage additive in the paper mat.

2. The method of claim 1 in which the paper mat is formed by removing some of the water from the combination.

3. The method of claim 1 in which at least some of the calcium carbonate is in one form selected from the list consisting of: undispersed calcium carbonate, dispersed slurry calcium carbonate, chalk, and any combination thereof.

4. The method of claim 1 in which at least a portion of the calcium carbonate is in a dispersed slurry calcium carbonate form, the dispersed slurry calcium carbonate further comprising at least one item selected from: polyacrylic acid polymer dispersants, sodium polyphosphate dispersants, Kaolin clay slurry, and any combination thereof.

5. The method of claim 1 in which the blend of filler particles is 50% ground calcium carbonate and 50% precipitated calcium carbonate.

6. The method of claim 1 in which the composition of matter is a coagulant.

7. The method of claim 1 in which the composition of matter is a coagulant selected from the list consisting of inorganic coagulants, organic coagulants, condensation polymerization coagulants, and any combination thereof.

8. The method of claim 1 in which the composition of matter is a coagulant having a molecular weight range of between 200 and 1,000,000.

9. The method of claim 1 in which the composition of matter is a coagulant selected from the list consisting of: alum, sodium aluminate, polyaluminum chlorides, aluminum chlorohydroxide, aluminum hydroxide chloride, polyaluminum hydroxychloride, sulfated polyaluminum chlorides, polyaluminum silica sulfate, ferric sulfate, ferric chloride, epichlorohydrin-dimethylamine (EPI-DMA), EPI-DMA ammonia crosslinked polymers, polymers of ethylene dichloride and ammonia, polymers of ethylene dichloride, polymers of dimethylamine, condensation polymers of multifunctional diethylenetriamine, condensation polymers of multifunctional tetraethylenepentamine, condensation polymers of multifunctional hexamethylenediamine condensation polymers of multifunctional ethylenedichloride, melamine polymers, formaldehyde resin polymers, cationically charged vinyl addition polymers, and any combination thereof.

10. The method of claim 1 in which the composition of matter is an AcAm/DADMAC copolymer.

11. The method of claim 1 in which the drainage additive or wet web strength additive or wet strength aid is one selected from the list of glyoxylated Acrylamide/DADMAC copolymer, poly-vinylamine, poly-vinylamide, poly-diallylamine, and any combination thereof.

12. The method of claim 1 in which the ratio of drainage additive or wet web strength additive or wet strength aid relative to the solid portion of the paper mat is 0.3 to 5 kg of strength additive per ton of paper mat.

13. The method of claim 1 in which at least some of the GCC particles are treated with the composition of matter.

14. The method of claim 1 in which none of the PCC particles are treated with the composition of matter.

15. The method of claim 1 in which the paper mat has a solid portion and the filler particles in the paper mat comprise more than 50% of the combined mass of the solid portion of the paper mat.

16. The method of claim 1 in which the drainage additive or wet web strength additive or wet strength aid and the composition of matter carry the same charge.

17. The method of claim 1 in which the blend of filler particles further comprises one item selected from the list consisting of organic pigment, inorganic pigment, clay, talc, titanium dioxide, alumina trihydrate, barium sulfate, magnesium hydroxide, and any combination thereof.

18. A method of papermaking comprising the use of filler, the method comprising the steps of:
providing a blend of filler particles, at least one drty strength aid, and cellulose fiber stock,
treating the filler particles with a composition of matter in the absence of cellulose fiber stock,
combining the filler particles with the cellulose fiber stock,
treating the combination with at least one dry strength aid, and
forming a paper mat from the combination,
wherein at least 10% of the filler particles are in a dispersed slurry calcium carbonate form,
the cellulose fiber stock comprises a plurality of cellulose fibers and water, and
the composition of matter enhances the performance of the dry strength aid in the paper mat.

19. A method of increasing the interactions between a drainage additive or wet web strength additive or wet strength aid and cellulose fibers mixed with filler particles, the method comprising the steps of:
pre-treating filler particles with a composition of matter in the absence of cellulose fiber stock,
combining the pre-treated filler particles with cellulose fibers, and
treating the combination with at least one drainage additive or wet web strength additive or wet strength aid,
wherein the filler particles are selected from the list consisting of precipitated calcium carbonate, ground calcium carbonate, and any combination thereof, and
the composition of matter inhibits the drainage additive or the wet web strength additive or wet strength aid from adhering to the filler particles.

* * * * *